United States Patent
Yu et al.

(10) Patent No.: US 6,563,513 B1
(45) Date of Patent: May 13, 2003

(54) IMAGE PROCESSING METHOD AND APPARATUS FOR GENERATING LOW RESOLUTION, LOW BIT DEPTH IMAGES

(75) Inventors: Qing Yu, Rochester, NY (US); Jiebo Luo, Pittsford, NY (US); Richard A. Simon, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/568,759

(22) Filed: May 11, 2000

(51) Int. Cl.[7] .................................................. G09G 5/00
(52) U.S. Cl. ....................................................... 345/698
(58) Field of Search .......................... 345/89, 589, 600, 345/605, 690, 698, FOR 152, FOR 166; 348/28, 384.1, 671; 382/163, 169, 172, 260, 263, 264, 279, 254, 255

(56) References Cited

U.S. PATENT DOCUMENTS 5,825,936 A * 10/1998 Clarke et al. ................ 382/261
5,978,035 A * 11/1999 Geshwind .................... 348/441
2002/0057850 A1 * 5/2002 Sirohey et al. ............... 382/299

* cited by examiner

Primary Examiner—Matthew C. Bella
Assistant Examiner—G. F. Cunningham
(74) Attorney, Agent, or Firm—Thomas H. Close

(57) ABSTRACT

A digital image processing method for generating a low resolution, low bit depth digital image from a higher resolution, higher bit depth input color digital image, includes the steps of: generating a gray scale image from the input color digital image; generating a valley image; filtering the valley image with a rank order filter to produce a filtered valley image; thresholding the filtered valley image to generate a binary valley image; generating a shadow image and a highlight image from the gray scale image; combining the shadow image, the highlight image, and the binary valley image to produce a combined binary image; and subsampling the combined binary image to a desired low resolution.

12 Claims, 4 Drawing Sheets

IMAGE PROCESSING METHOD AND APPARATUS FOR GENERATING LOW RESOLUTION, LOW BIT DEPTH IMAGES

FIELD OF THE INVENTION

This invention relates to the field of digital image processing, and more particularly to methods and apparatus for producing very low resolution, low bit depth images.

BACKGROUND OF THE INVENTION

It would be desirable to display consumer images on the display panels of cellular telephones and personal digital assistants (PDA's). Unfortunately, the displays on currently available cellular telephones and personal digital assistants have a very low resolution (e.g. 95×45 to 302×98 pixels) and low bit depth (e.g. 1 bit). A digital image of a high resolution (e.g. 1536×1024 pixels) and a high bit depth (e.g. 24 bits) can be produced by a digital camera or by scanning a consumer film. If it is subsampled to the resolution of the small display and halftoned to produce a 1-bit depth binary image, the features in the resulting image are rendered indistinctly.

One approach to producing a low resolution, low bit depth digital image is to first reduce the bit depth of the image using the "stamp filter" available in Adobe Photoshop™, and then sub-sample the image to reduce the resolution. It is believed that the stamp filter employs a rank order filter and a thresholding operation to reduce the bit depth of the image. The resulting images, when displayed on a cellular telephone or PDA, tend to have too much dark areas, obscuring details in these dark areas.

There is a need therefore for an improved method of processing digital images to produce low resolution, low bit depth images.

SUMMARY OF THE INVENTION

The need is met according to the present invention by providing a digital image processing method for generating a low resolution, low bit depth digital image from a higher resolution, higher bit depth input color digital image, that includes the steps of: generating a gray scale image from the input color digital image; generating a valley image; filtering the valley image with a rank order filter to produce a filtered valley image; thresholding the filtered valley image to generate a binary valley image; generating a shadow image and a highlight image from the gray scale image; combining the shadow image, the highlight image, and the binary valley image to produce a combined binary image; and subsampling the combined binary image to a desired low resolution.

ADVANTAGES

The present invention has the advantage of producing a low resolution low bit depth digital image that is recognizable for its scene/event content on a display device with limited display area and bit depth, and enables efficient compression and transmission of images to mobile devices having low resolution displays.

DETAILED DESCRIPTION OF THE INVENTION

The present invention relates to a method and system for generating a low resolution, low bit depth digital image from a higher resolution, higher bit depth input color digital image. The low resolution, low bit depth digital image can be transmitted to a communication device such as a cellular telephone or a PDA through a wireless channel and viewed on the display panels of the cellular telephones or PDA.

Figure 1:
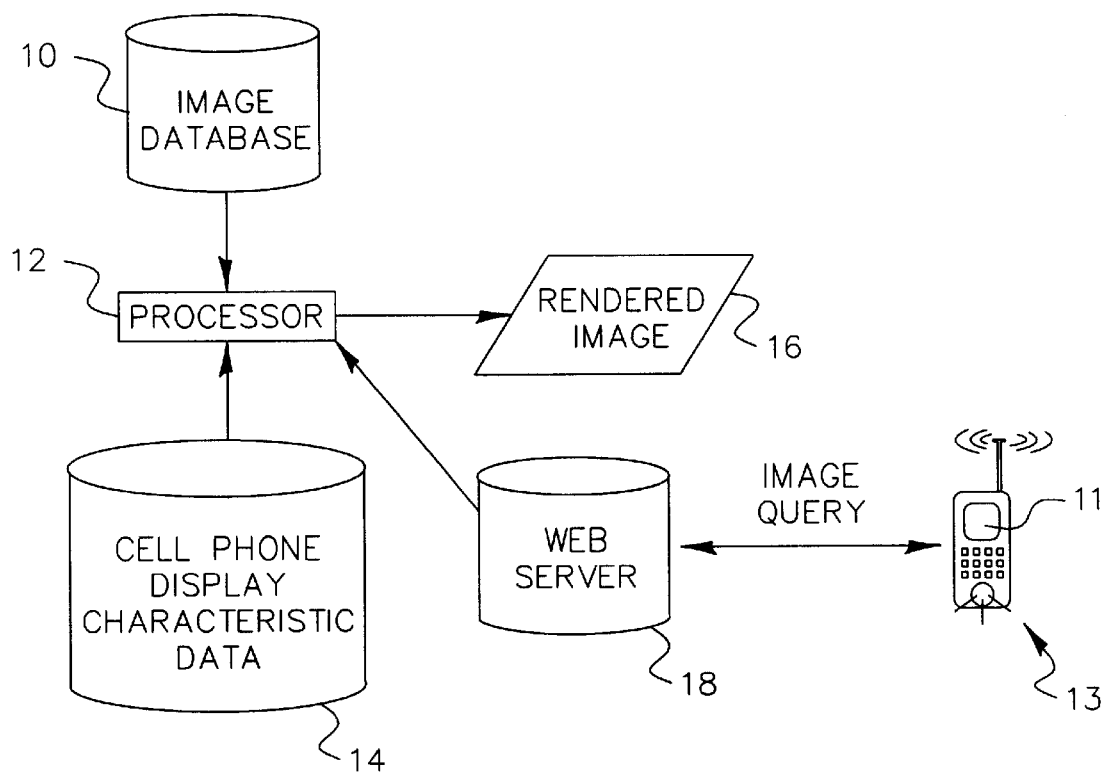
FIG. 1 is a schematic diagram illustrating a system that produces and displays low resolution, low bit depth images according to the present invention.

Referring to FIG. 1, a typical system for processing, transmiitting, and displaying digital images to handheld devices such as cellular telephones and PDA's is shown. The system includes a processor 12 that applies adequate rendering components (pre-processing followed by spatial/bit-depth decimation) to the input images from an image database 10 based on the display characteristics of a low resolution display 11, for example in a cell phone 13. The cell phone display characteristics are extracted from a database 14. The processor 12 outputs a rendered image 16 that suits the cell phone display screens 11. The rendered image 16 is transmitted, for example, to the cell phone 13 via a wireless channel by a web server 18.

Figure 2:
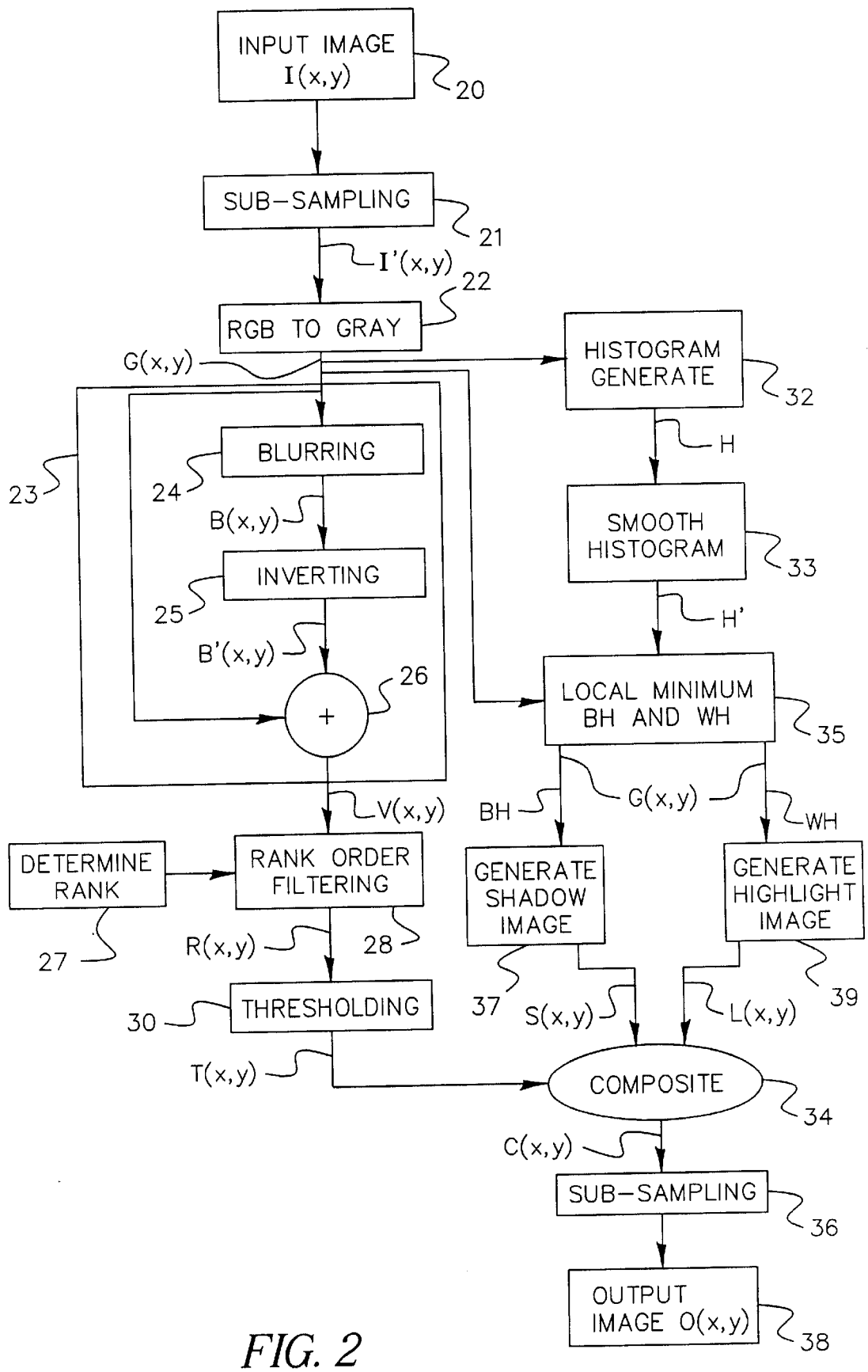
FIG. 2 is a flow chart illustrating the method of processing a digital image according to the present invention.

Referring to FIG. 2, in accordance with the present invention, an input color digital image I(x,y) 20 from the Image Database 10 will be processed by processor 12 before being transmitted to cellular telephones and PDA's. Typically, I(x,y) is a digital image of high resolution (e.g. 1536×1024 pixels) and high bit depth (e.g. 24 bits) produced by a digital camera or by scanning a consumer film. If the size of I(x,y) is larger than a predetermined size (e.g. 480×320), I(x,y) is first sub-sampled 21 to generate an input color digital image I'(x,y) of the predetermined size; otherwise, I'(x,y) will be same as I(x,y). I'(x,y) will then be converted 22 to a gray scale image G(x,y). An operation useful to generate a gray scale image from a RGB image is described by equation 1:

$$G(x,y)=aR'(x,y)+bG'(x,y)+cB'(x,y) \qquad (1)$$

where R'(x,y), G'(x,y) and B'(x,y) are the red, green and blue channels of the input digital color image I'(x,y). A typical set of coefficients for equation 1 according to the NTSC standard are a=0.3, b=0.59, and c=0.11. Other operations known in the art can also be used to generated the gray scale image.

In the next step 23, a valley image V(x,y) is generated from G(x,y). A typical way to generate a valley image from a gray scale image includes the steps of: blurring 24 the gray scale image G(x,y) to generate a blurred gray scale image B(x,y); inverting 25 B(x,y) by taking its complement (e.g. with respect to 255 if B(x,y) is an 8 bit image); and adding 26 the inverted blurred gray scale image B'(x,y) to the gray scale image G(x,y) to generate the valley image V(x,y).

Figure 5:
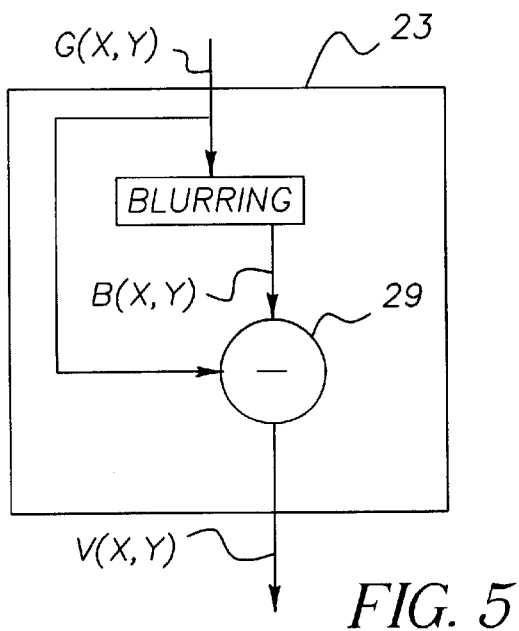
FIG. 5 is a flow chart showing an alternative embodiment of block 23 in FIG. 2.

Equivalently, as shown in FIG. 5, the blurred gray scale image may be directly subtracted from the gray scale image to generate the valley image.

The valley image V(x,y) is then filtered 28 with a rank order filter to produce a filtered valley image R(x,y). The rank order filtering is performed using a window that is moved over the image. The window size, shape, and the rank for the rank order filter are chosen based on the resolution and bit depth of the display of the corresponding cellular telephones and PDA's. The window is centered over each pixel in the image V(x,y), and the pixels in the window are rank ordered in a ascending or descending order. A pixel having a defined rank in the order is then selected. A corresponding pixel in R(x,y) is then set to the value of the selected pixel.

A subsampling factor F, i.e. the ratio of the predetermined size (e.g. 480×360) and the size of the display panel, is used to reduce the size of the image as described below. The subsampling factor F plays an important role in determining the rank of the selected pixel 27. Typically, a square-shaped window of 7×7 pixels is used. If desired, a circular window or any other specifically-shaped window can be used. The features in the final low resolution, low bit depth digital image should be at least one pixel wide to be visible, therefore the corresponding features in the filtered valley image R(x,y) need to be at least F pixels wide in order to survive the subsampling. Typically, if the subsampling factor F is 4 in each direction, the $15^{th}$ ranked pixel in an ascending order within the 7×7 window (a total of 49 pixels) is selected. If the subsampling factor F is higher, a lower ranked value should be used; and vise versa. For example, if F=1 (no subsampling), the $25^{th}$ (median in a 7×7 window) ranked value is appropriate; if F=2, the $21^{st}$ ranked value is selected; if F=3, the $18^{th}$ ranked values is selected; and so on. The valley image V(x,y) is then rank order filtered 28 to produce a filtered valley image R(x,y). The filtered valley image R(x,y) is further thresholded 30 to generate a binary valley image T(x,y). The preferred threshold for this operation is 250 for an 8-bit image.

From the gray scale image G(x,y), a histogram H is generated 32. H is further smoothed 33 to generate a smoothed histogram H'. The preferred smoothing technique is a 7 by 1 kernel that is convolved with the histogram. An example of such a smoothing filter kernel is shown in Table 2.

TABLE 2

| 1/7 | 1/7 | 1/7 | 1/7 | 1/7 | 1/7 | 1/7 |
| --- | --- | --- | --- | --- | --- | --- |

Figure 4:
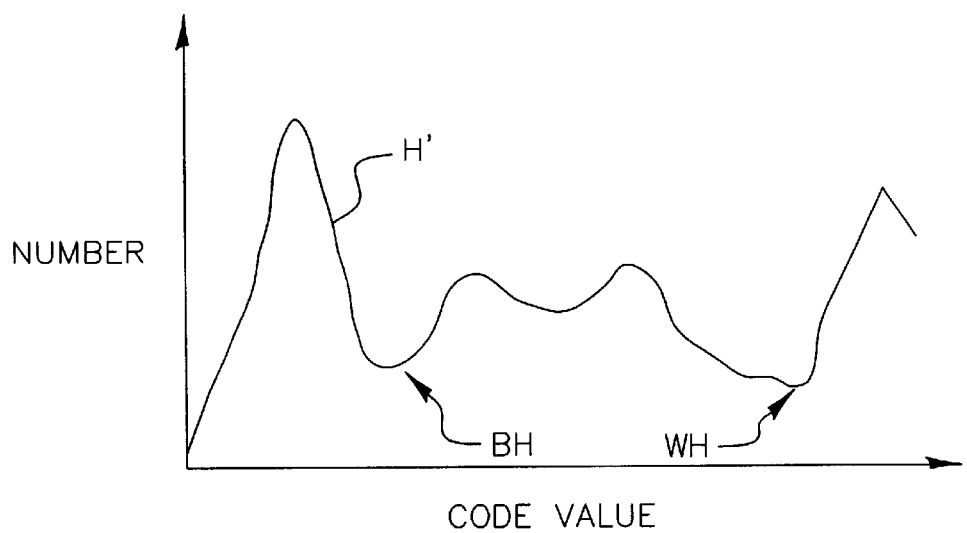
FIG. 4 is a histogram useful in describing the image processing according to the present invention.
Figure 6:
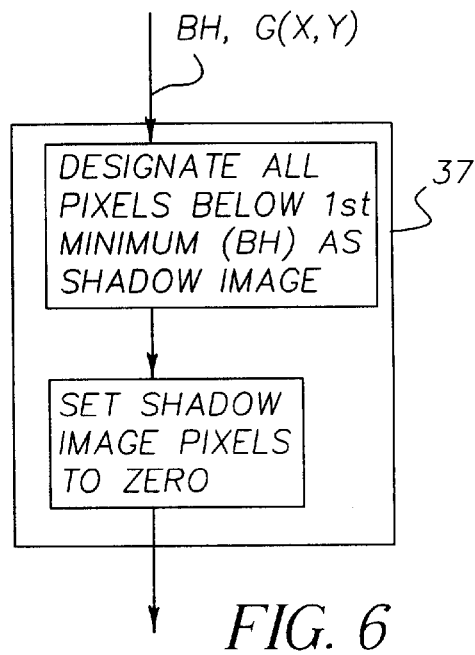
FIG. 6 is a flow chart showing block 37 of FIG. 2 in greater detail.
Figure 7:
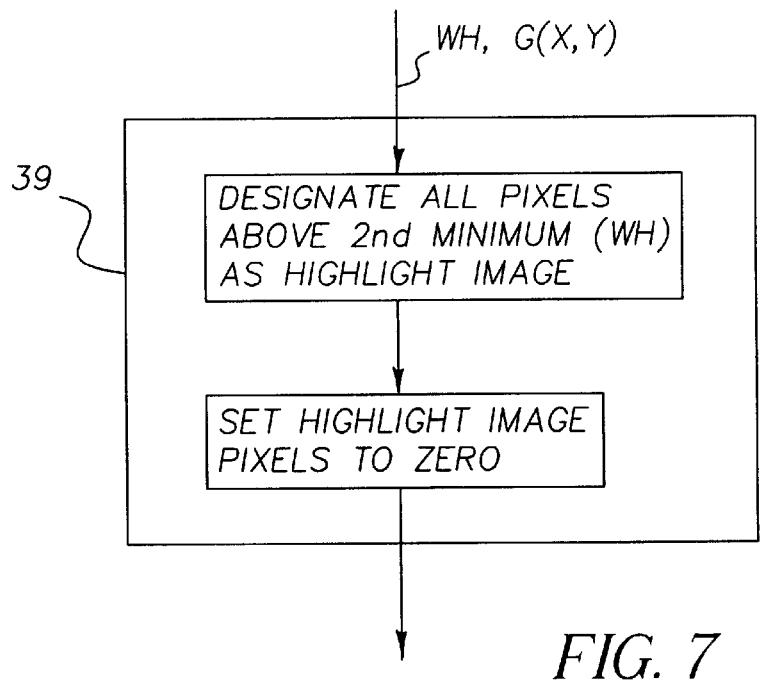
FIG. 7 is a flow chart showing block 39 of FIG. 2 in greater detail.

Referring to FIG. 4, from the smoothed histogram H', the first local minimum BH from the shadow end (corresponding to low intensity values) is located 35 as well as the first local minimum WH from the highlight end (corresponding to high intensity values). Next, a shadow image S(x,y) is generated 37 from the gray scale image G(x,y) such that all the pixels with values below BH are set to zero (as shown in FIG. 6), and a highlight image L(x,y) is generated 39 from the gray scale image G(x,y) such that all the pixels with values above WH are set to one(as shown in FIG. 7).

A composite binary image C(x,y) is further generated 34 from the binary valley image T(x,y), the shadow image S(x,y) and the highlight image L(x,y) in the following way:

a) if a pixel value in the shadow image S(x,y) is a zero, set the corresponding pixel value in the composite binary image C(x,y) to zero;

b) if a pixel value in the highlight image L(x,y) is a one, set the corresponding pixel value in the composite binary image C(x,y) to one; and c) otherwise, set the corresponding pixel value in the composite binary image C(x,y) to the value of the binary valley image T(x,y).

Finally, the composite binary image C(x,y) is subsampled 36 (employing the subsampling factor F) to an output image O(x,y) 38 with the desired low resolution of the display of the cellular telephones or PDA's.

The output binary image O(x,y) can be compressed (without information loss) with a run-length coder before being transmitted to the cellular telephone or PDA, and the cellular telephone or PDA will decompress the run-length encoded image data to reconstruct the output binary image O(x,y) before displaying it on the display panels. A halftoned binary image as employed in the prior art is in general not amenable to any efficient compression method (runlength coding in particular) because it contains mostly high frequency information. Run-length coding is the standard for coding and transmitting fax (also binary in nature). The image of the present invention therefore has the additional advantage over the low resolution halftone images of the prior art that it is more readily compressible.

Figure 3:
FIG. 3 shows an input image and low resolution images produced by the methods of the prior art and the present invention for comparison.

Referring now to FIG. 3 an input image 40 is shown. A low resolution, low bit depth image 46 produced by the method of the present invention is shown, and for comparison, a low resolution, low bit depth image 42 that was produced by sub-sampling and halftoning the input image 40 and a low resolution, low bit depth image 44 produced by "stamp-filtering" and sub-sampling are shown.

In a preferred embodiment of the present invention, the image processor 12 is implemented as a software program. Those skilled in the art will readily recognize that the equivalent of such software may also be constructed in hardware. Because image manipulation algorithms and systems are well known, the present description has been directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the specification, all software implementation thereof is conventional and within the ordinary skill in such arts. It will be understood that the invention may be sold and distributed as a computer program on a computer storage medium.

The invention has been described with reference to a preferred embodiment. However, it will be appreciated that variations and modifications can be effected by a person of ordinary skill in the art without departing from the scope of the invention.

PARTS LIST 10 image database
11 low resolution display
12 processor
13 cell phone
14 cell phone characteristic database
16 rendered image
18 web server
20 input color digital image I(x,y)
21 sub-sampling step
22 converting step 23 generate valley image step
24 blurring step
25 inverting step
26 adding step
27 rank determining step
28 rank order filtering step
30 thresholding step
32 histogram generation step
33 histogram smoothing step
34 generating composite image step
35 locating step
36 sub-sampling step
37 generating step
38 output image
39 generating step
40 input image
42 a low resolution, low bit depth image produced by sub-sampling and halftoning
44 a low resolution, low bit depth image produced by "stamp-filtering" and sub-sampling
46 a low resolution, low bit depth image produced by the method of the present invention

What is claimed is:

1. A digital image processing method for generating a low resolution, low bit depth digital image from a higher resolution, higher bit depth input color digital image, comprising the steps of:
   a) generating a gray scale image from the input color digital image;
   b) generating a valley image;
   c) filtering the valley image with a rank order filter to produce a filtered valley image;
   d) thresholding the filtered valley image to generate a binary valley image;
   e) generating a shadow image and a highlight image from the gray scale image;
   f) combining the shadow image, the highlight image, and the binary valley image to produce a combined binary image; and
   g) sub-sampling the combined binary image to generate an output binary image with desired low resolution.

2. The method claimed in claim 1, wherein the input digital image is larger than a predetermined size, further comprising the step of first sub-sampling the input digital image to the predetermined size.

3. The method claimed in claim 2, wherein the predetermined size is 480×320 pixels.

4. The method claimed in claim 1, wherein the valley image is generated by:
   a) blurring the gray scale image to generate a blurred gray scale image; and
   b) subtracting the blurred gray scale image from the gray scale image.

5. The method claimed in claim 1, wherein the shadow image and the highlight image are generated by the steps of:
   a) generating a histogram of the gray scale image;
   b) smoothing the histogram;
   c) locating a first minimum in the histogram from either end of the histogram; and
   d) designating all pixels with values below the first minimum as the shadow image and setting these pixels to zero, and designating all the pixels above the second minimum as the highlight image and setting these values to one.

6. The method claimed in claim 1, wherein the combining step includes the steps of:
   a) if a pixel value in the shadow image is a zero, setting the corresponding pixel value in the combined image to zero;
   b) if a pixel value in the highlight image is a one, setting the corresponding pixel value in the combined image to one; and
   c) otherwise, setting the corresponding pixel value in the combined image to the value of the binary valley image.

7. A computer storage medium having instructions stored thereon for causing a computer to perform the method of claim 1.

8. The computer storage medium claimed in claim 7, wherein the input digital image in the method of claim 1 is larger than a predetermined size, and the method of claim 1 further comprising the step of first sub-sampling the input digital image to the predetermined size.

9. The computer storage medium claimed in claim 8, wherein the predetermined size is 480×320 pixels.

10. The computer storage medium claimed in claim 7, wherein the valley image in the method of claim 1 is generated by:
    a) blurring the gray scale image to generate a blurred gray scale image; and
    b) subtracting the blurred gray scale image from the gray scale image.

11. The computer storage medium claimed in claim 7, wherein the shadow image and the highlight image in the method of claim 1 are generated by the steps of:
    a) generating a histogram of the gray scale image;
    b) smoothing the histogram;
    c) locating a first minimum in the histogram from either end of the histogram; and
    d) designating all pixels with values below the first minimum as the shadow image and setting these pixels to zero, and designating all the pixels above the second minimum as the highlight image and setting these values to one.

12. The computer storage medium claimed in claim 7, wherein the combining step in the method of claim 1 includes the steps of:
    a) if a pixel value in the shadow image is a zero, setting the corresponding pixel value in the combined image to zero;
    b) if a pixel value in the highlight image is a one, setting the corresponding pixel value in the combined image to one; and
    c) otherwise, setting the corresponding pixel value in the combined image to the value of the binary valley image.

* * * * *